United States Patent
Chae et al.

(10) Patent No.: US 12,455,320 B2
(45) Date of Patent: Oct. 28, 2025

(54) BUS BAR ASSEMBLY AND CURRENT MEASURING DEVICE

(71) Applicant: SMART ELECTRONICS INC., Ulju-gun (KR)

(72) Inventors: Hong Il Chae, Gyeongsan-si (KR); Hyun Chang Kim, Ulju-gun (KR); Kwang Hoon Lee, Yangsan-si (KR); Won Seok Kim, Yeonje-gu (KR); Hyuk Jae Kwon, Yangsan-si (KR); Young Min Son, Dong-gu (KR); Hyeon Chang Jeong, Dongnae-gu (KR)

(73) Assignee: SMART ELECTRONICS INC., Ulju-gun (KR)

( * ) Notice: Subject to any disclaimer, the term of this patent is extended or adjusted under 35 U.S.C. 154(b) by 169 days.

(21) Appl. No.: 18/514,388

(22) Filed: Nov. 20, 2023

(65) Prior Publication Data
US 2024/0168098 A1    May 23, 2024

(30) Foreign Application Priority Data
Nov. 21, 2022    (KR) .................. 10-2022-0156195

(51) Int. Cl.
*G01R 31/3842* (2019.01)
*G01R 31/374* (2019.01)
(Continued)

(52) U.S. Cl.
CPC ....... *G01R 31/3842* (2019.01); *G01R 31/374* (2019.01); *H01M 50/503* (2021.01); *H01M 50/569* (2021.01)

(58) Field of Classification Search
CPC .................. G01R 31/3842; G01R 31/374; G01R 31/364; G01R 1/203; G01R 15/146;
(Continued)

(56) References Cited

U.S. PATENT DOCUMENTS

| | | |
|---|---|---|
| 845,996 A | 3/1907 | Benecke |
| 3,330,027 A | 7/1967 | Warren et al. |

(Continued)

FOREIGN PATENT DOCUMENTS

| | | |
|---|---|---|
| CN | 101452014 B | 9/2013 |
| CN | 106981680 A | 7/2017 |

(Continued)

OTHER PUBLICATIONS

Office Action issued by Taiwanese Patent Office dated May 1, 2024 in counterpart Taiwanese patent application.
(Continued)

*Primary Examiner* — Lee E Rodak
*Assistant Examiner* — Zannatul Ferdous
(74) *Attorney, Agent, or Firm* — Whitaker Chalk Swindle & Schwartz PLLC; Enrique Sanchez, Jr.

(57) ABSTRACT

A bus bar assembly and current measuring device configured to reduce measurement errors through linearity compensation and temperature compensation for the difference in values of two or more measured currents, thereby achieving high-accuracy current measurement, is presented. The present invention discloses a bus bar assembly including: a first conductive plate and a second conductive plate each composed of a plurality of parts; and an insulator formed between the first conductive plate and the second conductive plate, wherein a common first terminal hole is formed at one end of the first conductive plate, one end of the second conductive plate, and one end of the insulator, a common second terminal hole is formed at respective opposite ends of the first conductive plate, the second conductive plate, and the insulator. According to the present invention, stable and highly reliable current measurement is possible through multiple shunt resistors based on a redundancy design.

15 Claims, 17 Drawing Sheets
(5 of 17 Drawing Sheet(s) Filed in Color)

(51) Int. Cl.
*H01M 50/503* (2021.01)
*H01M 50/569* (2021.01)

(58) Field of Classification Search
CPC ..... G01R 19/25; G01R 19/32; H01M 50/503; H01M 50/569; H01R 13/02; H01R 13/40
See application file for complete search history.

(56) References Cited

U.S. PATENT DOCUMENTS

| | | | | |
|---|---|---|---|---|
| 2011/0241649 A1* | 10/2011 | Ozawa | ............... | G01R 31/364 |
| | | | | 324/76.11 |
| 2018/0174721 A1* | 6/2018 | Kameko | ............... | H01C 13/00 |
| 2019/0004094 A1* | 1/2019 | Park | ............... | H01M 10/48 |
| 2020/0064380 A1 | 2/2020 | Li et al. | | |
| 2020/0371138 A1* | 11/2020 | Kim | ............... | G01R 19/16504 |

FOREIGN PATENT DOCUMENTS

| | | |
|---|---|---|
| JP | 2013174555 A | 9/2013 |
| JP | 2017015588 A | 1/2017 |
| JP | 2017033664 A | 2/2017 |
| JP | 2017208474 A | 11/2017 |
| JP | 20180013466 A | 2/2018 |
| JP | 2019059268 A | 4/2019 |
| JP | 2019531469 A | 10/2019 |
| JP | 2020118629 A | 8/2020 |
| JP | 2021009103 A | 1/2021 |
| JP | 2021190619 A | 12/2021 |
| KR | 200804571 A | 2/2008 |
| KR | 101049052 B1 | 7/2011 |
| KR | 101296838 B1 | 8/2013 |
| KR | 101299904 B1 | 9/2013 |
| KR | 20130124881 A | 11/2013 |
| KR | 101998091 B1 | 7/2019 |
| WO | 2017018278 A1 | 2/2017 |
| WO | 2021090905 A1 | 5/2021 |

OTHER PUBLICATIONS

EP 23210204 European Search Report; mailed Apr. 12, 2024, 5 pages (Year: 2024).

* cited by examiner

|  | BEFORE APPLYING ALGORITHM | AFTER APPLYING ALGORITHM |
| --- | --- | --- |
| ACCURACY | -0.03%~0.05% | -0.01%~0.01% |
| LINEARITY | 0.08% | 0.02% |

FIG. 17

BUS BAR ASSEMBLY AND CURRENT MEASURING DEVICE

CROSS-REFERENCE TO RELATED APPLICATION(S)

This application claims the benefit under 35 USC § 119(a) of Korean Patent Application No. 10-2022-0156195, filed on Nov. 21, 2022, in the Korean Intellectual Property Office, the entire disclosure of which is incorporated herein by reference for all purposes.

BACKGROUND

1. Field

The present invention relates to a bus bar assembly and current measuring device including the same, and more specifically, to a bus bar assembly connected to a battery and a current measuring device capable of measuring current input and output from the battery.

2. Description of Related Art

A shunt resistor refers to a resistor with a very low resistance value that is primarily used to measure current. Current measurement using a shunt resistor, as compared to using a Hall sensor that utilizes the magnetic field generated when current flows through a wire, is characterized by its ability to measure current with high precision at a low cost.

An ammeter equipped with a coil can include a shunt resistor connected in parallel internally. In contrast, an ammeter connected in series to a terminal formed by cutting the wire can measure the current flowing through the wire using the intensity of the magnetic field formed in the coil and the current value flowing through the shunt resistor.

When a shunt resistor is integrated into the middle of a wire, the voltage formed at both ends of the shunt resistor is measured, and a current value can be calculated from the measured voltage using Ohm's law.

The current flowing through terminals connected to a battery, such as in the case of battery discharge or charging, serves as an indicator for calculating the remaining capacity or charge capacity of the battery. Therefore, precise current measurement is required.

For stable current sensing in batteries, for example, electric vehicle batteries, redundancy is achieved by using two or more resistors based on the concept of redundancy. However, if there is a significant difference in the measured current values used for redundancy verification, it may pose problems in determining the state of the battery. Additionally, as the conduction-time of the current and the current value increases, the battery's temperature rises, and the error range also increases. This requires the measurement of current values that accurately represent the actual chemical state of the battery.

SUMMARY

The present disclosure provides technological advantages as a bus bar assembly and current measuring device. The present disclosure provides for a device integrated into a practical application with meaningful limitations that may include one or more of the following objects to reduce measurement errors through linearity compensation and temperature compensation for the difference in values of two or more measured currents, thereby achieving high-accuracy current measurement.

One object of the present invention is to provide a bus bar assembly including a plurality of shunt resistors based on a redundancy design.

Another object of the present invention is to provide a current measuring device which uses a shunt resistor to measure current flowing in a bus bar assembly.

Still another object of the present invention is to provide a current measuring device capable of performing temperature compensation for a measured current value by predicting the temperature of a bus bar assembly at a high temperature.

Objects of the present invention should not be limited to the above objects and other unmentioned objects will be clearly understood by those skilled in the art from the following description.

In one embodiment of the present invention, a dual configuration, i.e., redundancy design, is a current measuring device that uses a shunt resistor with two resistance values on a single bus bar and has two independent analog-to-digital converters (ADCs). The purpose of the current measuring device is to detect rapidly changing currents, compare two current values, and transmit a warning message to an upper system when the error between these two current values exceeds a preset value.

The number of shunt resistors is not limited to two, and the technical concept of the present invention may also be applied when a single bus bar includes a plurality of shunt resistors.

The current measuring device includes an isolated voltage converter to be used in high-voltage applications and is characterized by including a digital isolated converter for communications.

The two shunt resistors can be changed to various ratios of 1:1, 2:1, 0.75:1, etc. as needed to allow for verification of not only optimal current measurement but also the current value within the current sensor itself. Additionally, when necessary, one shunt resistor may be combined with other measurement methods, such as Hall sensors, magnetic resistance sensors, and the like, and this combination provides the advantage of independent validation of relevant values within the current sensor.

Conventionally, when switching is performed using a single analog-to-digital converter, it is difficult to simultaneously measure rapidly changing current values, and the verification of current values has issues related to the time difference in current measurements, causing unnecessary diagnostics even when the actual current values are the same.

To address these issues, two independent analog-to-digital converters (ADCs) are used, and a compensation algorithm is separately employed to ensure their independence. The measurement times are synchronized to enhance the verification function of the current values.

In an embodiment of the present invention, the number of ADCs is not limited to two. Since shunt resistors are sensitive to temperature, a temperature sensor must be used. However, the temperature sensor is incapable of measuring the actual temperature of the shunt resistor that has risen due to high current. Therefore, a temperature prediction algorithm is needed. This temperature prediction algorithm predicts the temperature based on factors such as the magnitude of current, conduction time of current, external temperature, and shunt resistance value. A synchronization algorithm uses a low-speed converter to obtain a measured value and then compares it with a high-speed converter value. When the output of the measured value matches the high-speed value, the current value may be determined at a high speed, and current value can be verified.

Additionally, the current measuring device is characterized by having the function of rolling count (RC) and cyclic redundancy check (CRC) for detection of common omissions and errors.

In order to achieve the above objects, according to an embodiment of the present invention, there is provided a bus bar assembly including: a first conductive plate composed of a plurality of parts; a second conductive plate composed of a plurality of parts; and an insulator formed between the first conductive plate and the second conductive plate, wherein a common first terminal hole is formed at one end of the first conductive plate, one end of the second conductive plate, and one end of the insulator, a common second terminal hole is formed at respective opposite ends of the first conductive plate, the second conductive plate, and the insulator, the first conductive plate includes at least one first shunt resistor, the first shunt resistor, between the parts of the first conductive plate, electrically connects a part where the first terminal hole is formed and a part where the second terminal hole is formed, the second conductive plate includes at least one second shunt resistor, the second shunt resistor, between the parts of the second conductive plate, electrically connects a part where the first terminal hole is formed and a part where the second terminal hole is formed, and sensing pins necessary for measuring a voltage drop are formed at both ends of the first shunt resistor and the second shunt resistor.

In addition, the first conductive plate may include a single first shunt resistor, a second conductive plate may include a single second shunt resistor, and the sensing pin may be configured to include a first sensing pin and a second sensing pin that are respectively disposed at both ends of the first shunt resistor; and a third sensing pin and a fourth sensing pin that are respectively disposed at both ends of the second shunt resistor.

Additionally, the first shunt resistor and the second shunt resistor may be configured to have different resistance values.

Additionally, at least one of the first terminal hole or the second terminal hole may be configured to be electrically connected to a terminal of a battery.

Additionally, the first conductive plate and the second conductive plate may be configured to be electrically connected in parallel with each other to the terminal of the battery.

In order to achieve the above object, according to an embodiment of the present invention, there is provided a current measuring device including: a bus bar assembly; and a current measurement unit connected to the bus bar assembly, wherein the bus bar assembly includes a first conductive plate composed of a plurality of parts; a second conductive plate composed of a plurality of parts; and an insulator formed between the first conductive plate and the second conductive plate, wherein a common first terminal hole is formed at one end of the first conductive plate, one end of the second conductive plate, and one end of the insulator, a common second terminal hole is formed at respective opposite ends of the first conductive plate, the second conductive plate, and the insulator, the first conductive plate includes at least one first shunt resistor, the first shunt resistor, between the parts of the first conductive plate, electrically connects a part where the first terminal hole is formed and a part where the second terminal hole is formed, the second conductive plate includes at least one second shunt resistor, the second shunt resistor, between the parts of the second conductive plate, electrically connects a part where the first terminal hole is formed and a part where the second terminal hole is formed, and sensing pins necessary for measuring a voltage drop are formed at both ends of the first shunt resistor and the second shunt resistor.

In addition, the measurement unit may be configured to include a voltage measuring unit connected to the sensing pins to measure a first voltage drop and a second voltage drop; a current calculation unit configured to calculate a first current and a second current that flow through the first shunt resistor and the second shunt resistor, respectively; a temperature measurement unit configured to measure a temperature change due to the first current and the second current by using a temperature sensor; and a control unit configured to determine a state of a battery using a difference between a first current value and a second current value calculated through synchronization and temperature compensation.

In addition, the current measuring device may further include a linearity compensation unit configured to compensate for linearity for each current segment based on an inflection point according to an amplification factor of the first current and the second current.

In addition, the current measuring device may further include a temperature compensation unit configured to determine a temperature prediction variable according to the magnitudes of the first and second current values and current application time and perform temperature compensation for the first current value and the second current value using a temperature prediction variable value calculated based on the temperature prediction variable.

In addition, the current measuring device may further include a battery state determination unit configured to determine an error according to a range of a difference value and diagnose a state of the battery according to the number of occurrences of error.

In order to achieve the objects of the present invention, according to an embodiment of the present invention, there is provided a current measuring method, which is performed by a current measuring device, including: measuring a first voltage drop across both ends of a first shut resistor of a bus bar assembly electrically connected to a battery and a second voltage drop across both ends of a second shunt resistor, which is in parallel or serial connection with the first shunt resistor; calculating a first current and a second current flowing, respectively, through the first shunt resistor and the second shunt resistor using a first voltage drop value and a second voltage drop value; and determining a state of the battery using a difference between a first current value and a second current value.

In addition, in the current measuring method, the calculating of the first current and the second current may include converting the first voltage drop value and the second voltage drop value into digital values; calculating the first current value and the second current value by applying calibration data for the first shunt resistor and calibration data for the second shunt resistor to the first voltage drop value and the second voltage drop value, respectively; and amplifying the first current value and the second current value.

Additionally, the current measuring method may further include measuring temperature due to current using a temperature sensor.

In addition, in the current measuring method, the temperature sensor may include an internal temperature sensor configured to measure a first temperature value of the bus bar assembly and an external temperature sensor configured to measure a second temperature value of a printed circuit board (PCB) where the bus bar assembly is installed, and the measuring of the temperature may include applying a weight to each of the first temperature value and the second temperature value.

Further, the current measuring method may further include performing linearity compensation for the first current value and the second current value using linearity data that includes a temperature value, inflection point information of the first current value and the second current value, amplification values of the first current value and the second current value, and a temperature prediction rise value due to current.

In addition, the current measuring method is characterized in that the performing of the linearity compensation includes compensating for linearity for each current segment based on an inflection point according to an amplification factor of the first current and the second current.

Additionally, the current measuring method may further include performing synchronization and temperature compensation for the first and second current values that change rapidly according to changes in temperature.

In addition, in the current measuring method, the performing of the synchronization and temperature compensation may include determining a temperature prediction variable according to the magnitudes of the first and second current values and the current application time; calculating a temperature prediction variable value based on the temperature prediction variable, and performing temperature compensation for the first current value and the second current value using the temperature prediction variable value.

The details of other embodiments are incorporated in "DETAILED DESCRIPTION OF THE INVENTION" and accompanying "Drawings".

The advantages and/or features, and schemes of achieving the advantages and features of the present invention will be apparently comprehended by those skilled in the art based on the embodiments, which are detailed later in detail, together with accompanying drawings.

This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The present invention is only defined within the scope of accompanying claims.

According to an embodiment of the present invention, stable and highly reliable current measurement is possible through multiple shunt resistors based on a redundancy design.

Additionally, stable current measurement is achievable based on parallel connection of shunt resistors, as compared to series connection.

Moreover, it is possible to reduce the gaps and increase the robustness of bus bars through parallel connection of bus bars.

Furthermore, measurement errors in current values may be reduced through linearity compensation and temperature compensation.

The effects that can be obtained by a bus bar assembly and a current measuring device according to the technical concept of the present invention are not limited to the effects mentioned above, and other effects not mentioned are expected to be clearly understood by those skilled in the art to which the present invention pertains from the following description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 17 is a table showing an example of the accuracy and linearity resulting from compensation according to an embodiment of the present invention.

Figure 1:
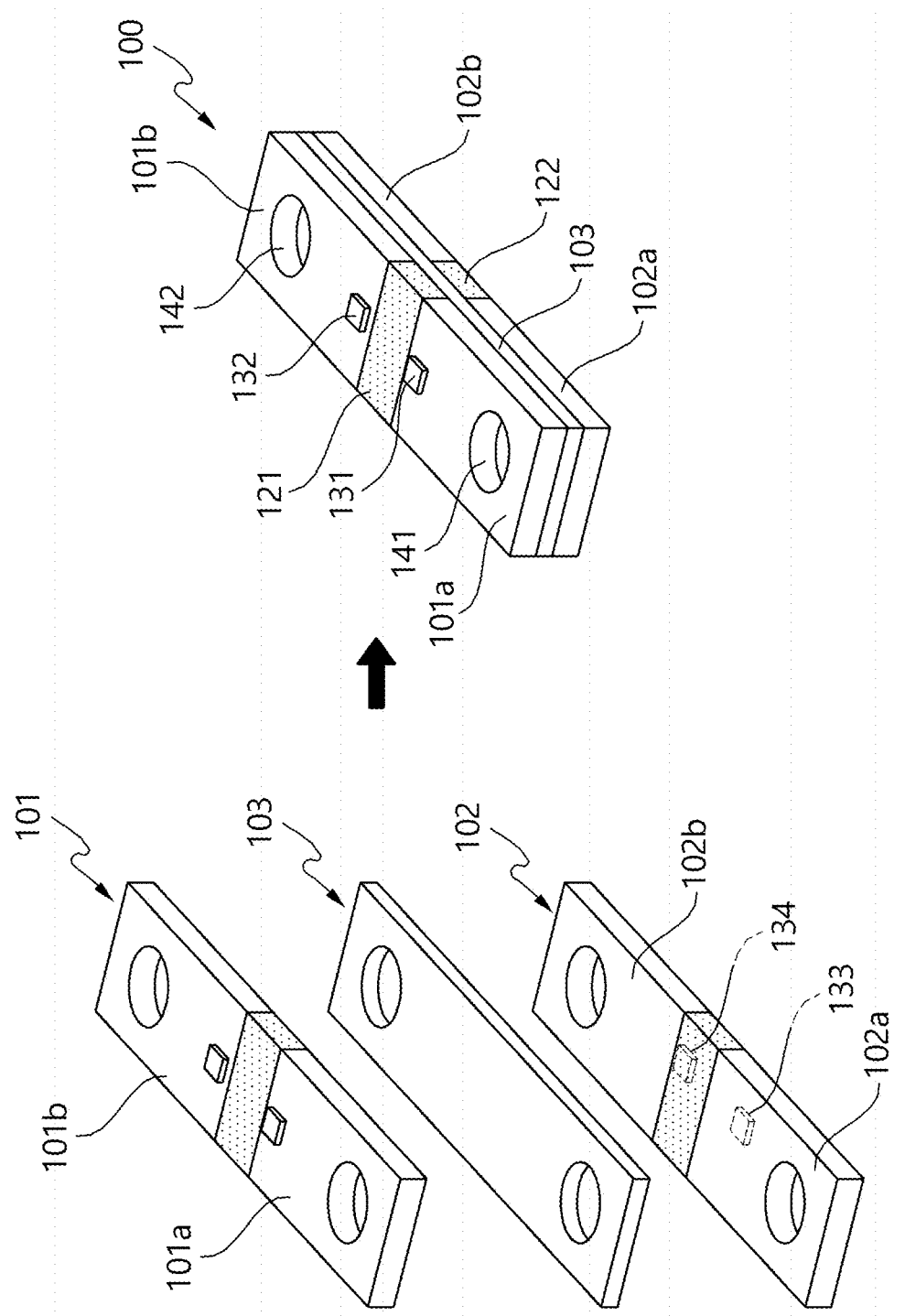
FIG. 1 is a schematic view of a bus bar assembly according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Before describing the present invention in detail, terms and words used herein should not be construed in an ordinary or dictionary sense and should not be construed as limiting the invention to the inventors of the present invention in the best way possible, and it is to be understood that the concepts of various terms can be properly defined and used, and further, these terms and words should be construed as meaning and concept consistent with the technical idea of the present invention.

That is, the terms used herein are used only to describe preferred embodiments of the present invention, and are not intended to specifically limit the contents of the present invention, and it should be noted that this is a defined term considering that many possibilities of the present invention.

Also, in this specification, the singular forms "a", "an", and "the" include plural referents unless the context clearly dictates otherwise, and similarly it should be understood that even if they are expressed in plural they may include singular meaning.

Where an element is referred to as "comprising" or "including" another element throughout this specification, unless explicitly described to the contrary, this will be understood to imply the inclusion of stated elements but not the exclusion of any other elements.

Further, when it is stated that an element is "inside or connected to another element", this element may be directly connected to another element or may be installed in contact with it, or may be installed spaced apart with a predetermined distance, and in the case where an element is installed to be spaced apart with a predetermined distance, a third element or means for fixing or connecting the element to another element may be present, and it should be noted that the description of the third element or means may be omitted.

In contrast, when an element is described as being "directly connected to" or "directly coupled to" or "directly access" another element, there are no intervening elements present.

Similarly, other words used to describe the relationship between elements should be interpreted in a like fashion (e.g., "between" versus "directly between", "adjacent" versus "directly adjacent", etc.).

In the following description, the terms of "one surface," "opposite surface," "one side," "opposite side," "first," and "second," if used, are used to clearly distinguish between one component and a different components, and the meanings of relevant components should not be limited by these terms.

Further, in the following description, terms of "on," "under," "left," and "right" related to a position, ifused, should be interpreted as representing a relative position of a relevant component in a relevant drawing. In addition, unless the position is not specified as an absolute position, the terms related to the position should not be interpreted as representing the absolute position.

In addition, regarding the reference numerals assigned to the elements in the drawings, it is should be noted that the same elements will be designated by the same reference numerals, wherever possible, even though they are shown in different drawings. In other words, throughout the specification, the same reference numeral is assigned to the same element.

It is to be understood that the size, position, coupling relationships and such, of each component constituting the present invention in the accompanying drawings, may be partially exaggerated or reduced or omitted to be able to sufficiently clearly convey the scope of the invention or for convenience of describing, and therefore the proportion or scale thereof may not be rigorous.

Also, in the following description of the present invention, a detailed description of a configuration that is considered to unnecessarily obscure the gist of the present invention, for example, a known technology including the prior art, may be omitted.

Hereinafter, exemplary embodiments of the present invention will be described in detail with reference to accompanying drawings.

A bus bar assembly 100 may be configured in a form in which a plurality of shunt resistors 120, for example, two or more shunt resistors 120, and a conductor 110 are alternately connected. The shunt resistors 120 may be connected to each other in series or in parallel. Hereinafter, a bus bar assembly 100 in which two shunt resistors 120 are connected in parallel with each other and a bus bar assembly 100 in which four shunt resistors 120 are connected in series and in parallel will be described.

FIG. 1 is a schematic view of a bus bar assembly according to an embodiment of the present invention.

Figure 2:
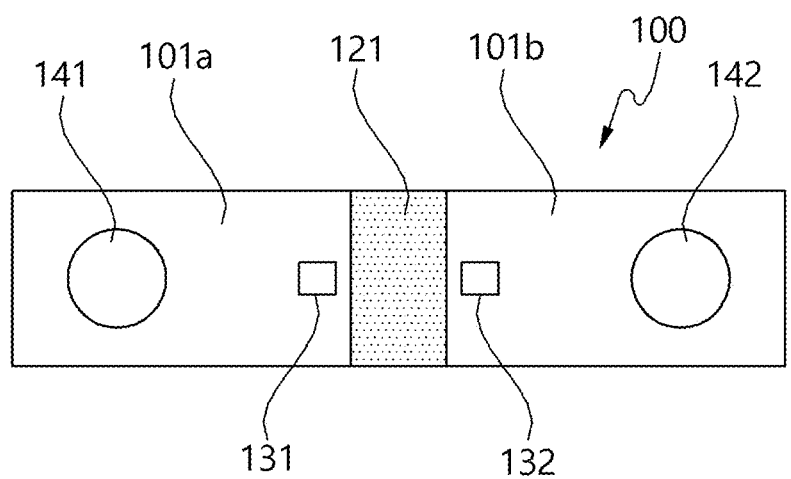
FIG. 2 is a plan view of a bus bar assembly according to an embodiment of the present invention.

FIG. 2 is a plan view of a bus bar assembly according to an embodiment of the present invention.

Figure 3:
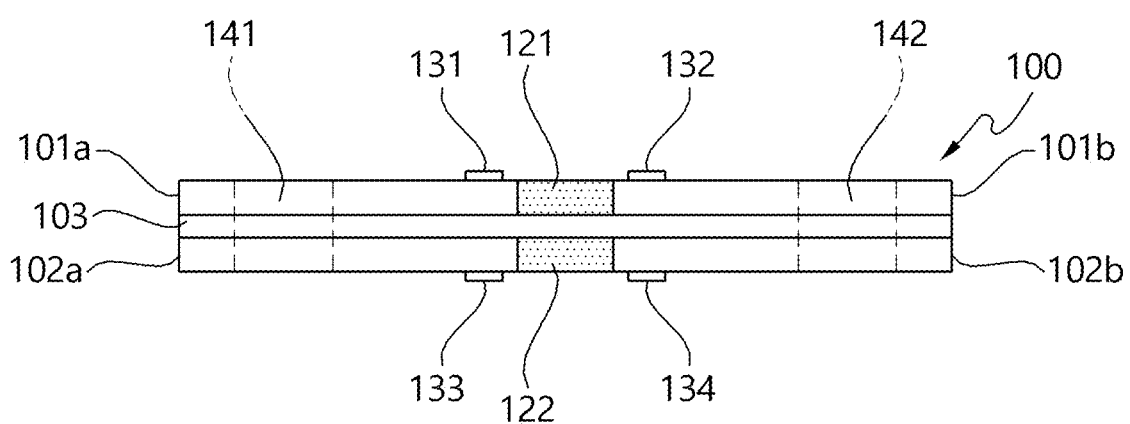
FIG. 3 is a front view of a bus bar assembly according to an embodiment of the present invention.

FIG. 3 is a front view of a bus bar assembly according to an embodiment of the present invention.

Referring to FIGS. 1 to 3, the bus bar assembly 100 may be configured to include a first conductive plate 101, a second conductive plate 102, and an insulator 103. The insulator 103 may be formed between the first conductive plate 101 and the second conductive plate 102 such that one surface of the insulator 103 is bonded to the first conductive plate 101 and the other side is bonded to the second conductive plate 102. The first conductive plate 101 may be separated into a first part 101a and a second part 101b, while the second conductive plate 102 may be separated into a third part 102a and a fourth part 102b.

A common first terminal hole 141 may be formed at one end of the first conductive plate 101, one end of the second conductive plate 102, and one end of the insulator 103, and a common second terminal hole 142 mat be formed at the respective opposite ends. The first terminal hole 141 and the second terminal hole 142 may be perforated before or after bonding. The bus bar assembly 100 may be electrically connected to a secondary battery through the first terminal hole 141 and the second terminal hole 142.

The first conductive plate 101 may include a first shunt resistor 121, and the first shunt resistor 121 may electrically connect the first part 101a where the first terminal hole 141 is formed and the second part 101b where the second terminal hole 142 is formed. The bus bar assembly 100 is not limited to a linear shape and may have other shapes, such as a "C" shape or an "S" shape.

The second conductive plate 102 may include a second shunt resistor 122, and the second shunt resistor 122 may electrically connect the third part 102a where the first terminal hole 141 is formed and the fourth part 102b where the second terminal hole 142 is formed.

In addition, a first sensing pin 131 and a second sensing pin 132 that are necessary, for measuring voltage drop may be formed at both ends of the first shunt resistor 121, and a third sensing pin 133 and a fourth sensing pin 134 that are necessary for measuring voltage drop may be formed at both ends of the second shunt resistor 122. In other words, sensing pins 130 may be arranged at both ends of the shunt resistor 120. Two selected sensing pins 130, namely, the first sensing pin 131 and the second sensing pin 132, or the third sensing pin 133 and the fourth sensing pin 134, may be respectively connected to the plus and minus terminals of a voltmeter.

The first shunt resistor 121 and the second shunt resistor 122 may be implemented using a copper alloy, such as manganin, an alloy of copper, manganese, and nickel. The first shunt resistor 121 and the second shunt resistor 122 have a relatively low resistance value, and a current value may be calculated by measuring the voltage between the sensing pins 130 at both ends of the first shunt resistor 121 and the second shunt resistor 122.

The first shunt resistor 121 and the second shunt resistor 122 may be configured to have different resistance values.

At least one of the first terminal hole 141 or the second terminal hole 142 may be configured to be electrically connected to a terminal of a battery. For example, the bus bar assembly 100 may be connected between batteries or at the ends of a series-parallel assembly of batteries.

Additionally, the first conductive plate 191 and the second conductive plate 102 may be configured to be electrically connected in parallel with each other to the terminal of the battery. That is, the current flowing through the battery is divided into the first conductive plate 101 and the second conductive plate 102 in inverse proportion to the sizes of the first shunt resistor 121 and the second shunt resistor 122.

In one embodiment of the present invention, the bus bar assembly 100 is a form in which is two bus bars are coupled with an insulator in between. Therefore, the coupled form of the bus bar assembly 100 has an advantage in reducing the step occurring at the connection area with the battery due to an increase in thickness.

In addition, the first shunt resistor 121 and the second shunt resistor 122, which are in parallel with each other, may classify the current, as compared to series connection, so that they can serve as backups for each other. For example, disconnection due to damage to either the first shunt resistor 121 or the second shunt resistor 121 may be prevented.

With the two conductive plates 101 and 102 and the insulator 103 forming a single bus bar assembly 100, the rigidity of the bus bar assembly 100 may be increased.

Figure 4:
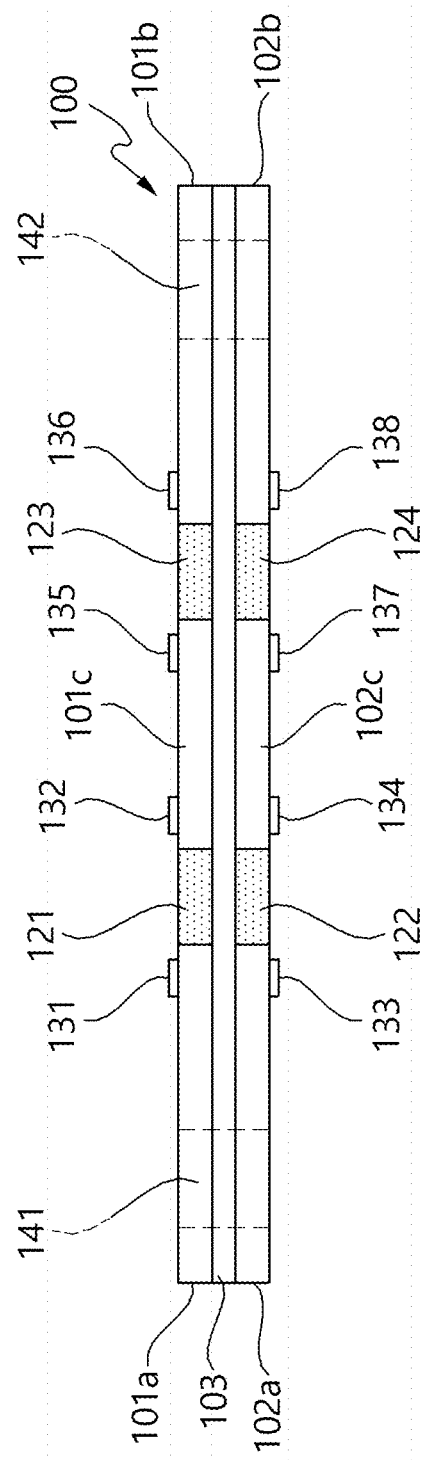
FIG. 4 is a front view of a bus bar assembly according to an embodiment of the present invention.

FIG. 4 is a front view of a bus bar assembly according to an embodiment of the present invention.

Referring to FIG. 4, a bus bar assembly 100 in which four shunt resistors 120 are connected in series and in parallel is depicted. Shunt resistors 120 connected in series or in parallel may be further included.

Compared to FIG. 3, two additional shunt resistors may have sensing pins 135, 136, 137, and 138 disposed at both ends. A fifth part 101*c* and a sixth part 102*c* may be further formed between shunt resistors connected in series. In the case where the bus bar assembly 100 includes four or more shunt resistors, voltage drop may be measured from pairs of sensing pins, such as two pairs, three pairs, or four pairs. According to one embodiment of the present invention, as the number of shunt resistors increases, the algorithm for current measurement may become more complex, but the reliability of current values based on redundancy theory may be enhanced.

Figure 5:
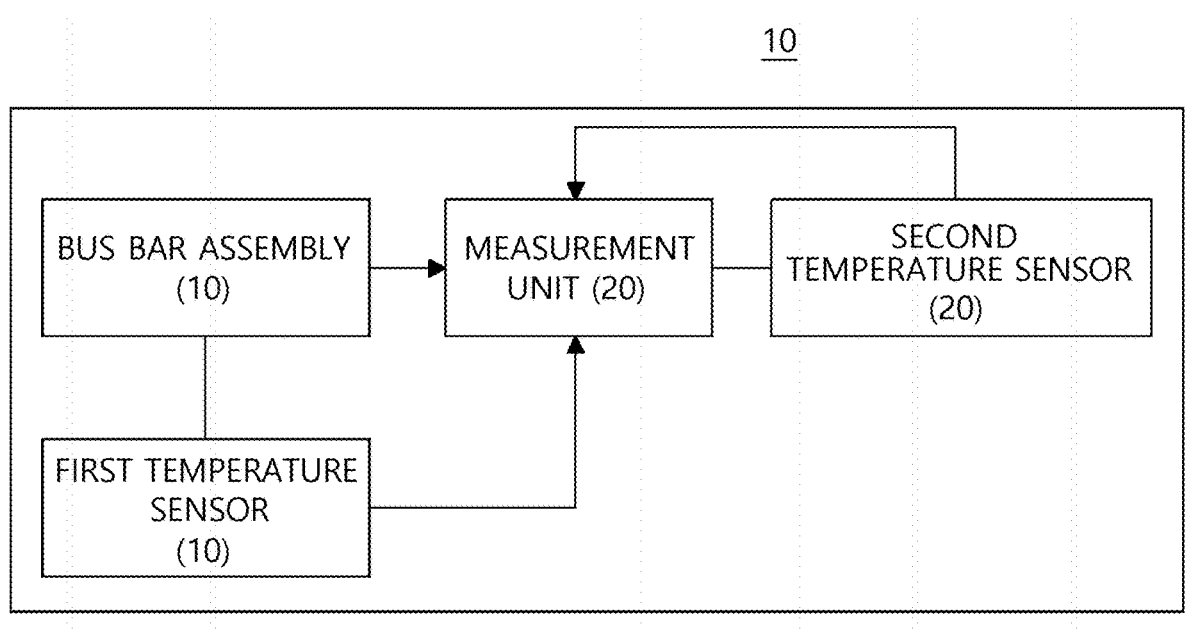
FIG. 5 is a block diagram illustrating a current measuring device according to an embodiment of the present invention.

FIG. 5 is a block diagram illustrating a current measuring device according to an embodiment of the present invention.

Referring to FIG. 5, a current measuring device 10 according to an embodiment of the present invention may be configured to include a bus bar assembly 100, a measurement unit 200, a first temperature sensor 310, and a second temperature sensor 320. The measurement unit 200 may be electrically connected to sensing pins 130 placed at both ends of a shunt resistor 120 included in the bus bar assembly 100.

The bus bar assembly 100 has the function of creating multiple voltage drops at both ends of each shunt resistor 120 using a first shunt resistor 121 and a second shunt resistor 122 connected in parallel with the first shunt resistor 121. The measurement unit 200 may be electrically connected to the sensing pins 130 formed at both ends of the shunt resistor 120.

The measurement unit 200 has the functions of measuring multiple voltage drops and, based on these measurements, calculating and compensating for the current to output an accurate current value during battery discharge and charging and further has the function of monitoring the battery's state based on the current value. Battery monitoring includes predicting the battery's lifespan and state of charge (SOC), and determining whether the battery is in a normal state.

The first temperature sensor 310, also referred to as an internal sensor, may be installed on the bus bar assembly 100 and is responsible for sensing the temperature of the bus bar assembly 100, specifically, a first temperature value. The second temperature sensor 320, also referred to as an external sensor, may be installed on a printed circuit board (PCB) where the bus bar assembly 100 is mounted, and is responsible for sensing the temperature of the circuit board, specifically, a second temperature value.

The measurement unit 200 is electrically connected to the first temperature sensor 310 and the second temperature sensor 320 and may receive input of the first temperature value and the second temperature value.

Figure 6:
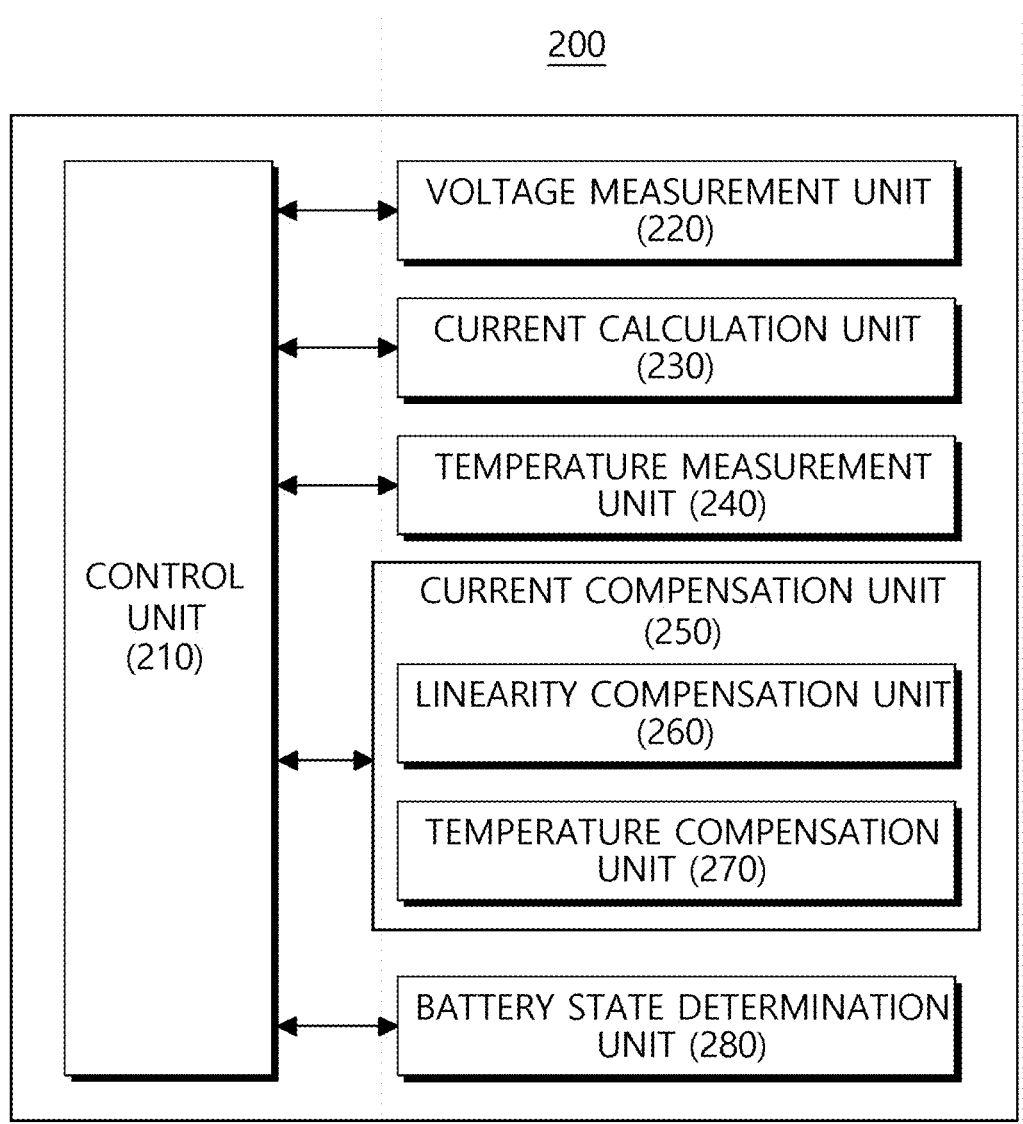
FIG. 6 is a block diagram illustrating a measurement unit included in the current measuring device.

FIG. 6 is a block diagram illustrating the measurement unit included in the current measuring device according to an embodiment of the present invention.

Referring to FIG. 6, the measurement unit 200 included in the current measuring device 10 according to an embodiment of the present invention may be configured to include a control unit 210, a voltage measurement unit 220, a current calculation unit 230, a temperature measurement unit 240, a current compensation unit 250, and a battery state determination unit 280.

The voltage measurement unit 220 has the function of measuring a first voltage drop across both ends of a first shunt resistor 121 of the bus bar assembly 100 electrically connected to a battery and a second voltage drop across both ends of a second shunt resistor 122, which is in parallel or serial connection with the first shunt resistor 121.

The current calculation unit 230 has the function of calculating a first current and a second current flowing through the first shunt resistor 121 and the second shunt resistor 122, respectively, using the values of the first and second voltage drops.

Here, the first current is the current flowing through the first shunt resistor 121 in parallel with the second shunt resistor 122, and the second current is the current flowing through the second shunt resistor 122. These currents correspond to the divided currents relative to the total current flowing in the battery. Taking this into consideration, the measurement unit 200 may output the divided first current value and second current value, or it may convert the divided current values back to the original current value by applying a weight and then output the converted current value.

The temperature measurement unit 240 has the function of measuring the temperature change of the shunt resistor 120 due to the first current and second current, using the first temperature sensor 310 and the second temperature sensor 320. The temperature measurement unit 240 receives the first temperature value and the second temperature value from the first temperature sensor 310 and the second temperature sensor 320, respectively, converts them into digital values, and applies weights to the converted first and second temperature values to output the shunt resistor's temperature value. The shunt resistor's temperature value may be used for linear compensation and temperature compensation of current values.

The control unit 210 has the function of determining the battery's state based on the difference between the first current value and the second current value calculated through linear compensation, synchronization, and temperature compensation by taking into account device characteristics. Before temperature compensation, the control unit 210 may compare the measurement times of the first and second voltage drop values. If the measurement times are different, the control unit may control the voltage measurement unit 220 to synchronize the measurement times based on one of the measurement times.

A linearity compensation unit 260 has the function of compensating for linearity for each current segment based on an inflection point according to the amplification factor of the first current and the second current. For example, the first current value may include errors when compared to an ideal value, and the error ratio may appear discontinuously on the graph due to non-linearity of the device. If linearity compensation is applied to such an error ratio, the error ratio may be continuously distributed.

A temperature compensation unit 270 has the function of determining a temperature prediction variable based on the magnitudes of the first current value and the second current value, as well as current application time, and performing temperature compensation for the first current value and the second current value based on the temperature prediction variable value derived from the temperature prediction variable. Temperature compensation for current values is necessary because the temperature measurement speed using temperature sensors cannot keep up with the temperature rise speed. Temperature compensation is required to measure rapidly changing temperatures.

The battery state determination unit 280 has the function of determining an error according to the range of the difference value and diagnosing the battery's state according to the number of occurrences of the error. The battery state determination unit 280 may determine whether the battery's state is normal or abnormal based on the difference between the first current value and the second current value. For example, if the difference value between the first current value and the second current value, computed through linearity compensation and temperature compensation, exceeds a pre-set threshold value or occurs beyond a threshold number of times, it is highly likely that the battery is not in a normal state. Hereinafter, a current measuring method S100 performed by the current measuring device 10 will be described.

Figure 7:
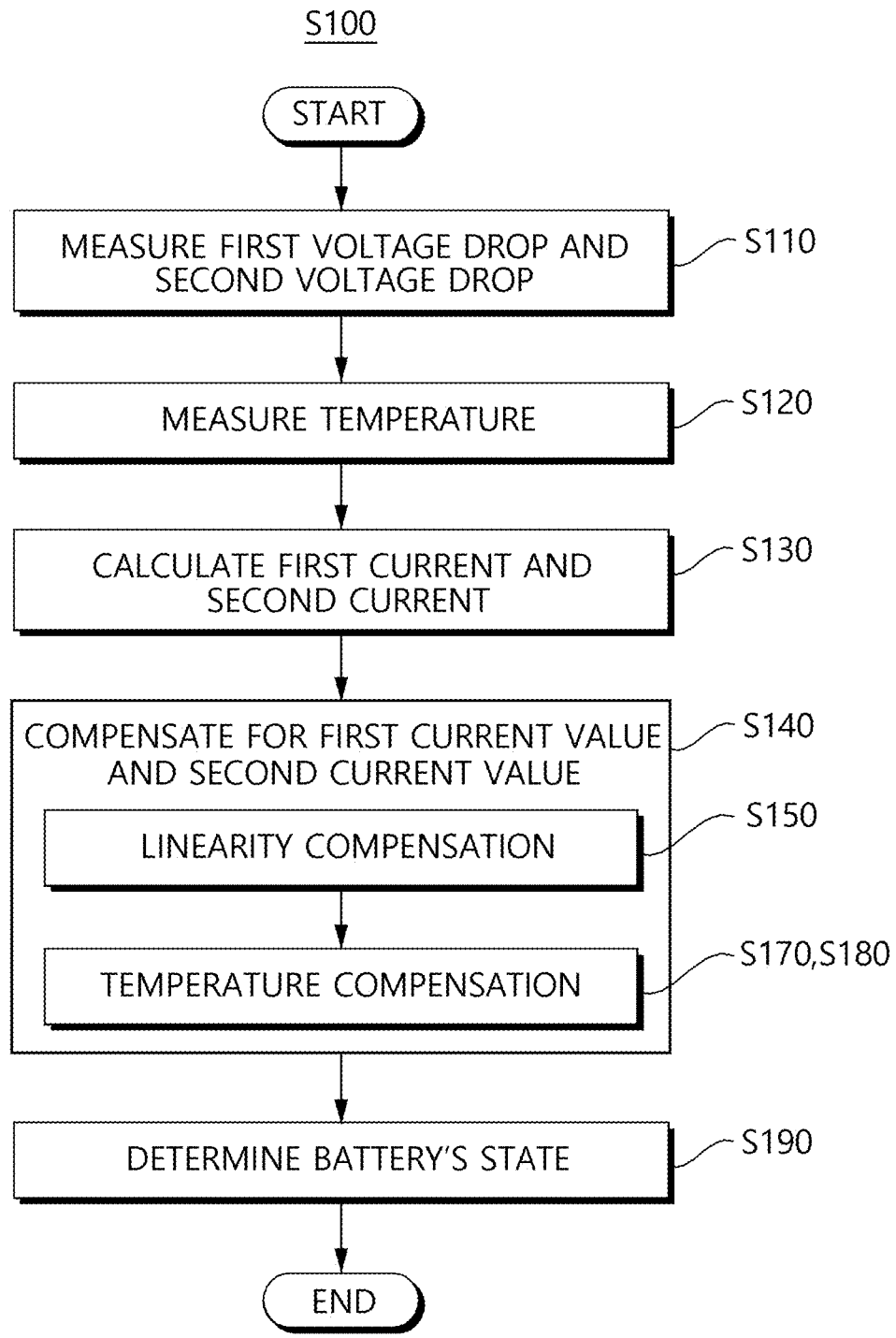
FIG. 7 is a flowchart illustrating a current measuring method according to an embodiment of the present invention.

FIG. 7 is a flowchart illustrating a current measuring method according to an embodiment of the present invention.

Referring to FIG. 7, a current measuring method S100 is configured to include voltage drop measurement S110, temperature measurement S120, current calculation S130, current value compensation S140, and battery state determination S190.

First, the current measuring device 10 may measure the first voltage drop across both ends of the first shunt resistor of the bus bar assembly electrically connected to the battery and the second voltage drop across both ends of the second shunt resistor, which is in parallel or serial connection with the first shunt resistor (S110).

The current measuring device 10 may measure the temperature due to current using a temperature sensor 300 (S120).

The temperature sensor 300 may be configured to include a first temperature sensor 310 configured to measure the first temperature value of the bus bar assembly and a second temperature sensor 320 configured to measure the second temperature value of the PCB where the bus bar assembly 100 is installed.

The temperature measurement operation S120 may be configured to include applying a weight to each of the first and second temperature values. Since the current flowing through the shunt resistor 120 is influenced by both the temperature of the bus bar assembly 100 and the temperature of the PCB connected to the bus bar assembly 100, the weights applied to the first temperature value and the second temperature value may vary depending on the connection relationship, shape, and size of the bus bar assembly 100 and the PCB.

Then, the current measuring device 10 may calculate the first current and the second current flowing, respectively, through a first shunt resistor 121 and a second shunt resistor 122 using the first voltage drop value and the second voltage drop value (S130). The calculation of current values is based on Ohm's law but may also use shunt resistor calibration data that includes discontinuity or inflection point information.

For example, the current measuring device 10 may convert the first voltage drop value and the second voltage drop value into digital values (S131), apply calibration data for the first shunt resistor and calibration data for the second shunt resistor to the first voltage drop value and the second voltage drop value, respectively, to calculate the first current and value the second current value (S132), and amplify the first current value and the second current value (S133).

Subsequently, the current measuring device 10 may perform various compensations for the first current value and the second current value (S140).

For example, the current measuring device 10 may perform linearity compensation for the first current value and the second current value using linearity data that includes a temperature value, inflection point information of the first current value and the second current value, amplification values of the first current value and the second current value, and a temperature prediction rise value due to current (S150).

The linearity compensation S150 is characterized by compensating for linearity for each current segment based on an inflection point according to the amplification factor of the first current and the second current.

Additionally, the current measuring device 10 may perform synchronization and temperature compensation for the first and second current values that change rapidly according to changes in temperature (S170 and S180).

For example, the current measuring device 10 may determine a temperature prediction variable according to the magnitudes of the first and second current values and the current application time, calculate a temperature prediction variable value based on the temperature prediction variable, and perform temperature compensation for the first current value and the second current value based on the temperature prediction variable value.

Figure 8:
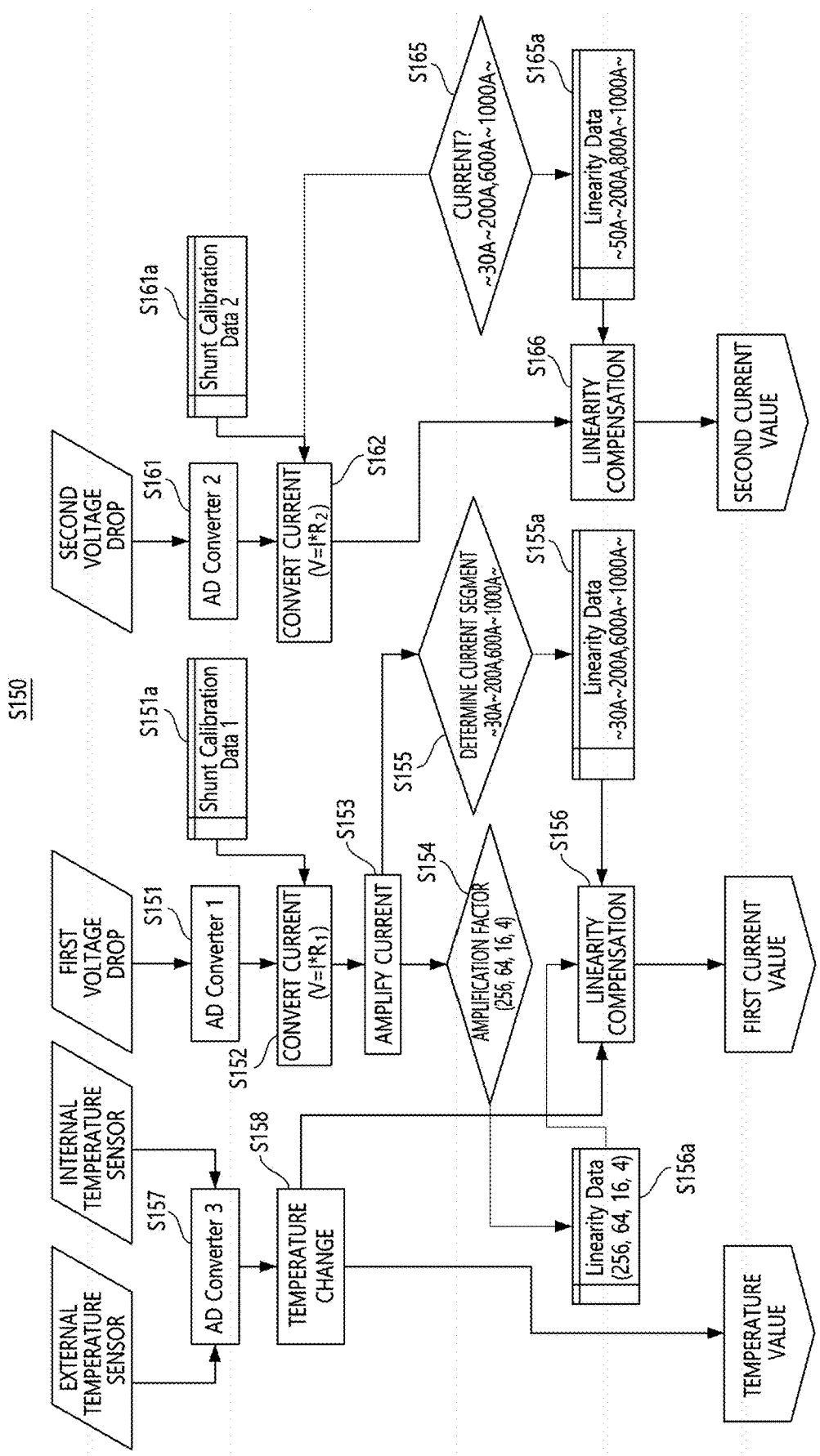
FIG. 8 is a detailed flowchart illustrating operation S150 of the method of FIG. 7.

Finally, the current measuring device 10 may determine the battery's state based on the difference between the first current value and the second current value (S190) FIG. 8 is a detailed flowchart illustrating operation S150 of the method of FIG. 7.

Referring to FIG. 8, the first voltage drop and the second voltage drop, measured by the voltage measurement unit 220, are converted into digital values (S151 and S161) and then converted into current values (S152 and S162). In this case, the first current value may be amplified through an amplifier (S153).

Next, linearity compensation for the first current value and the second current value is performed. The linearity compensation process may include determining amplification factors (256x, 64x, 16x, and 4x) according to the magnitude of the current value magnitude (S154) and determining current segments depicted in FIG. 6 (S155 and S165). The linearity compensation S156 and S166 may involve using the temperature converted at S158 and may use linearity data (S156a and S165a). Through linearity compensation, the first current value and the second current value are compensated into a new first current value and a new second current value.

The first temperature value collected through the internal sensor, i.e., the first temperature sensor 310, and the second temperature value collected through the external sensor, i.e., the second temperature sensor 320, are converted into digital values (S157) and then temperature is converted through the application of weights (S158).

Figure 9:
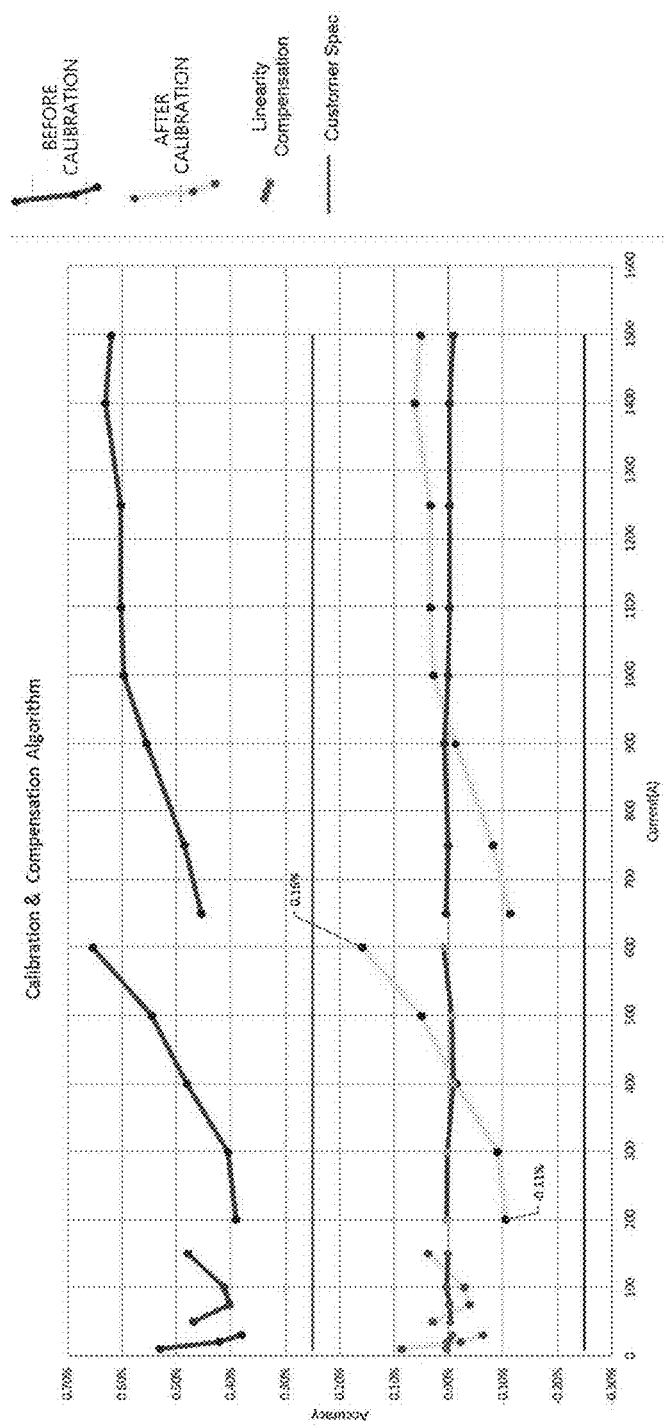
FIG. 9 is a graph showing an example of linearity compensation according to an embodiment of the present invention.

FIG. 9 is a graph showing an example of linearity compensation according to an embodiment of the present invention.

Referring to FIG. 9, a graph of before and after compensation by a linearity-related calibration and compensation algorithm is depicted. The error in a current value may be depicted as a discontinuous graph depending on the magnitude segment. For example, the error in the current value may be depicted in a total of four segments. Through linearity compensation, the graph is rearranged around the 0% error, which serves as the center for both positive and negative errors (yellow line). Ultimately, linearity compensation is performed such that the error range is close to 0% (green line). Here, "linearity compensation" refers to the point where linearity compensation takes place, and "customer spec" refers to the required error range.

Figure 10:
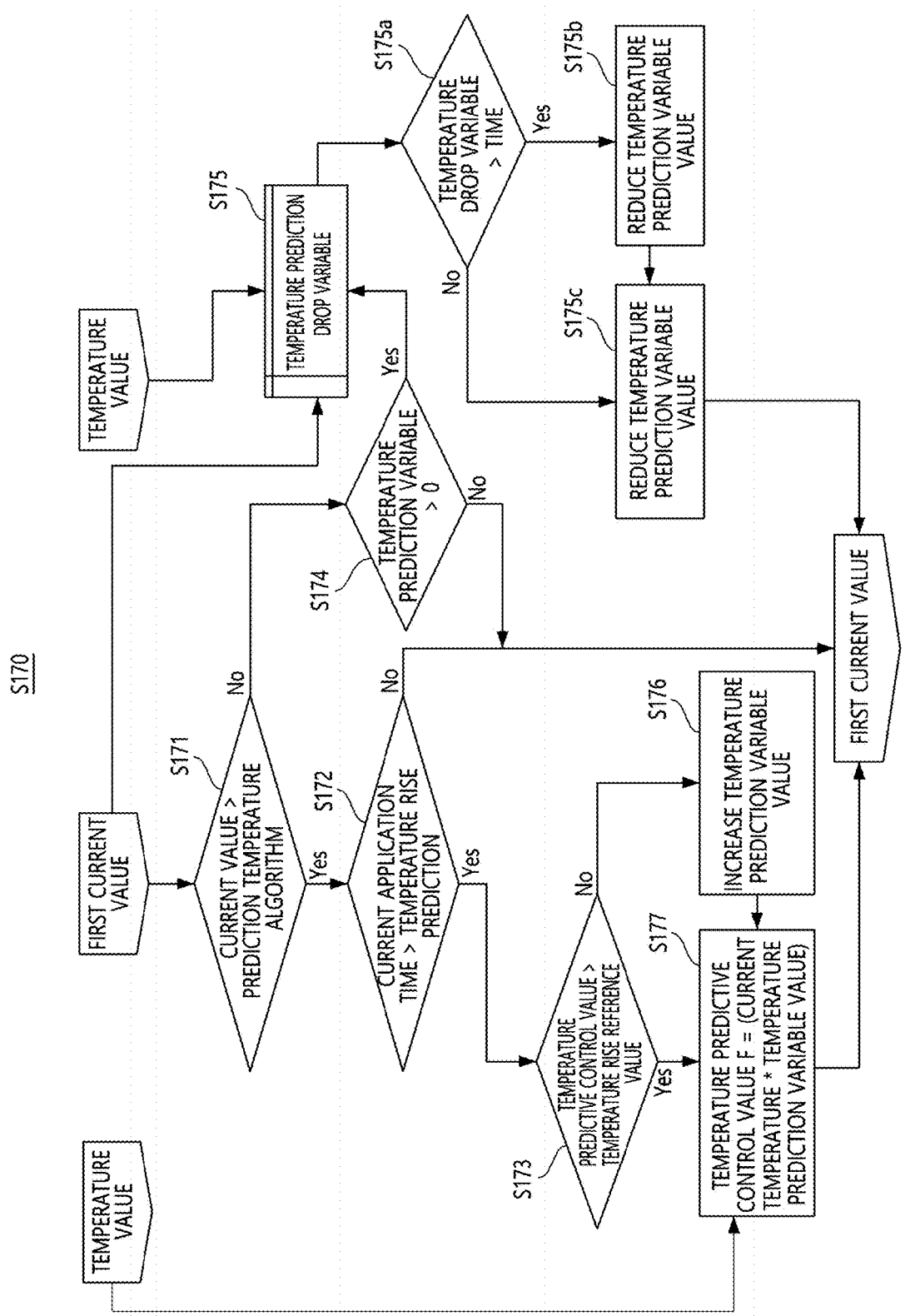
FIG. 10 is a detailed flowchart illustrating operation S10 of the method of FIG. 7.

FIG. 10 is a detailed flowchart illustrating operation S10 of the method of FIG. 7.

Figure 11:
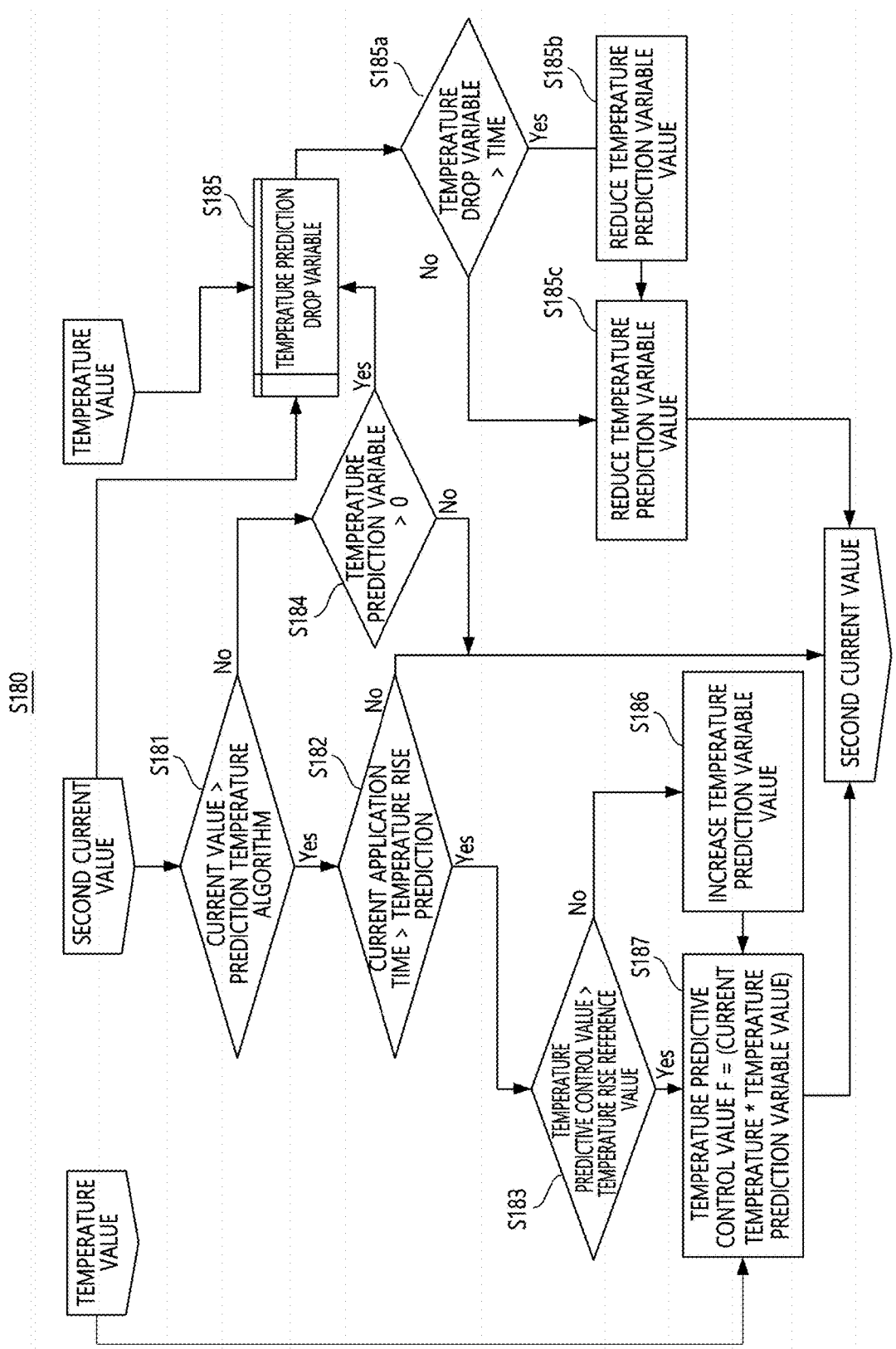
FIG. 11 is a detailed flowchart illustrating operation S180 of the method of FIG. 7.

FIG. 11 is a detailed flowchart illustrating operation S180 of the method of FIG. 7.

In FIG. 10, the temperature compensation process for the first current value is depicted, while FIG. 11 shows the temperature compensation process for the second current value. Since the temperature compensation process is commonly performed for both the first current and the second current, it will be described with reference to FIG. 10 as a representative example.

At S171, a process is performed to check if the measured current value falls within the current range in which the temperature sensor can respond. Referring to data before calibration in FIG. 12, it is observed that a deviation between the temperature sensor and the actual temperature occurs at currents exceeding approximately 300 A.

At S172, a current application time is checked because even when the current is applied consistently, the amount of error varies over time, so the temperature prediction value needs to change with time.

At S172, since the temperature prediction value is a function of current value and time, the process of setting a calibration limit for this and checking the temperature prediction value is performed. The temperature prediction value changes in real-time based on the current value and time.

S174 is a routine to proceed with the process of returning the predicted temperature to 0 if the current value is applied below the temperature prediction value.

S175a involves the speed adjustment for returning a predicted temperature control value based on the current value and the application time (time adjustment for the temperature sensor's value to match the actual temperature).

Because the accuracy varies depending on the current value and time, it is necessary for the temperature predictive control value to estimate the slope of the error value.

Figure 12:
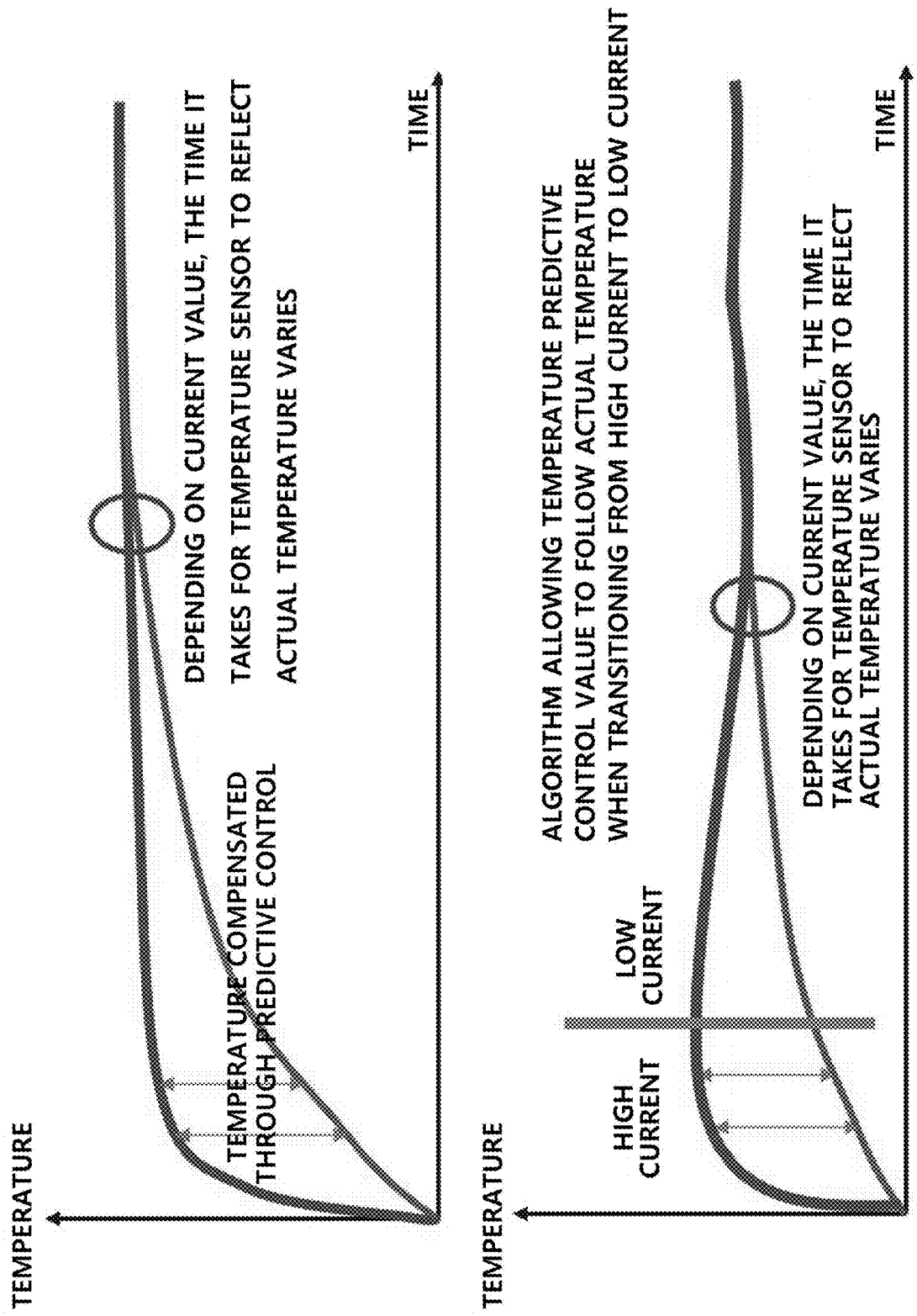
FIG. 12 illustrates graphs showing examples of temperature compensation according to an embodiment of the present invention.

FIG. 12 illustrates graphs showing examples of temperature compensation according to an embodiment of the present invention.

Referring to FIG. 12, temperature compensated through predictive control is illustrated. Depending on the current value, the time it takes for the temperature sensor to reflect the actual temperature may vary. Therefore, an algorithm that estimates the temperature prediction control value using the actual temperature when transitioning from high to low current may be used.

Figure 13:
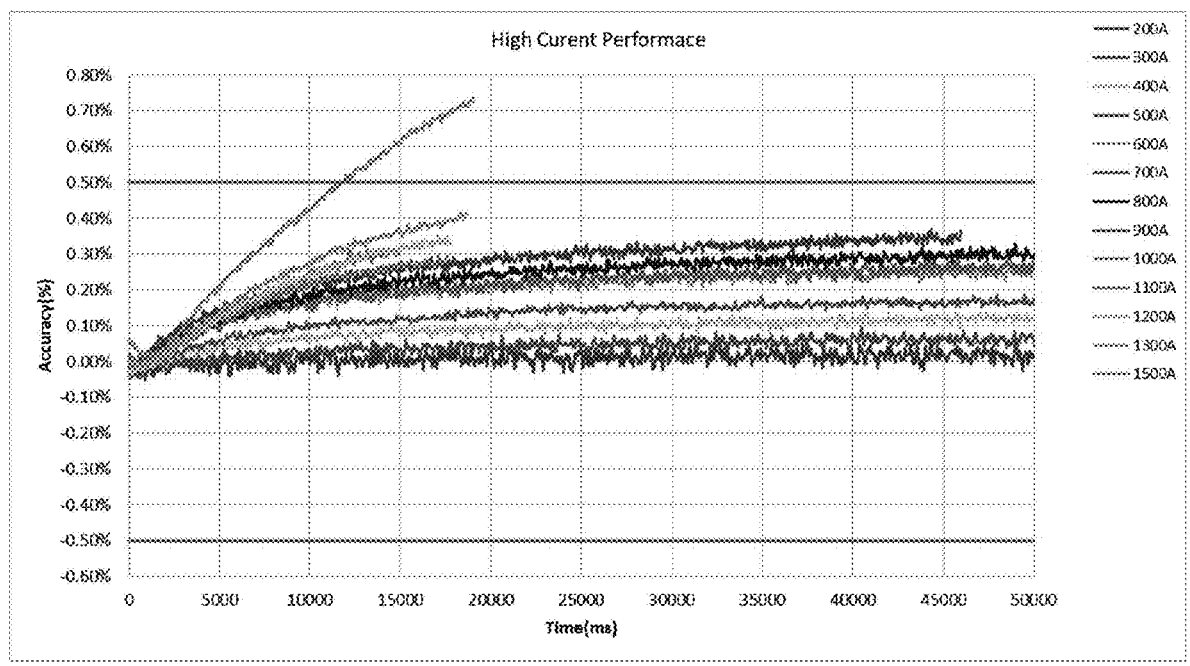
FIG. 13 is a graph showing data before temperature compensation according to an embodiment of the present invention.

FIG. 13 is a graph showing data before temperature compensation according to an embodiment of the present invention.

Figure 14:
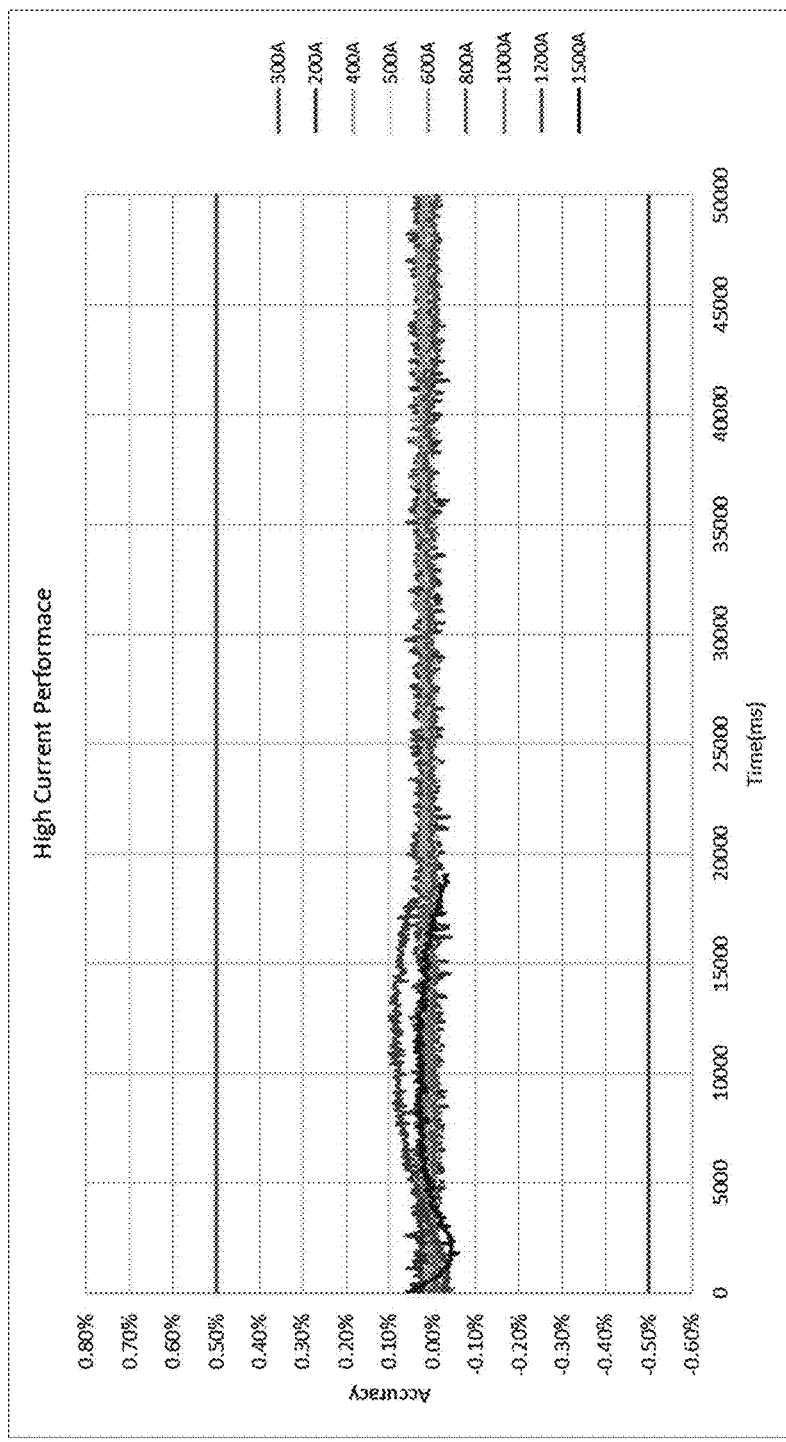
FIG. 14 is a graph showing data after temperature compensation according to an embodiment of the present invention.

FIG. 14 is a graph showing data after temperature compensation according to an embodiment of the present invention.

Referring to FIG. 13, in the graph of data before temperature compensation, it can be observed that the errors in the current values gradually increase over time. There are cases where the error in the current value exceeds an error range of 0.05%.

On the other hand, referring to FIG. 13, in the graph of data after temperature compensation, it can be seen that the errors in current values converge within a certain error range, for example, within the range of −0.10% to 0.10%.

Figure 15:
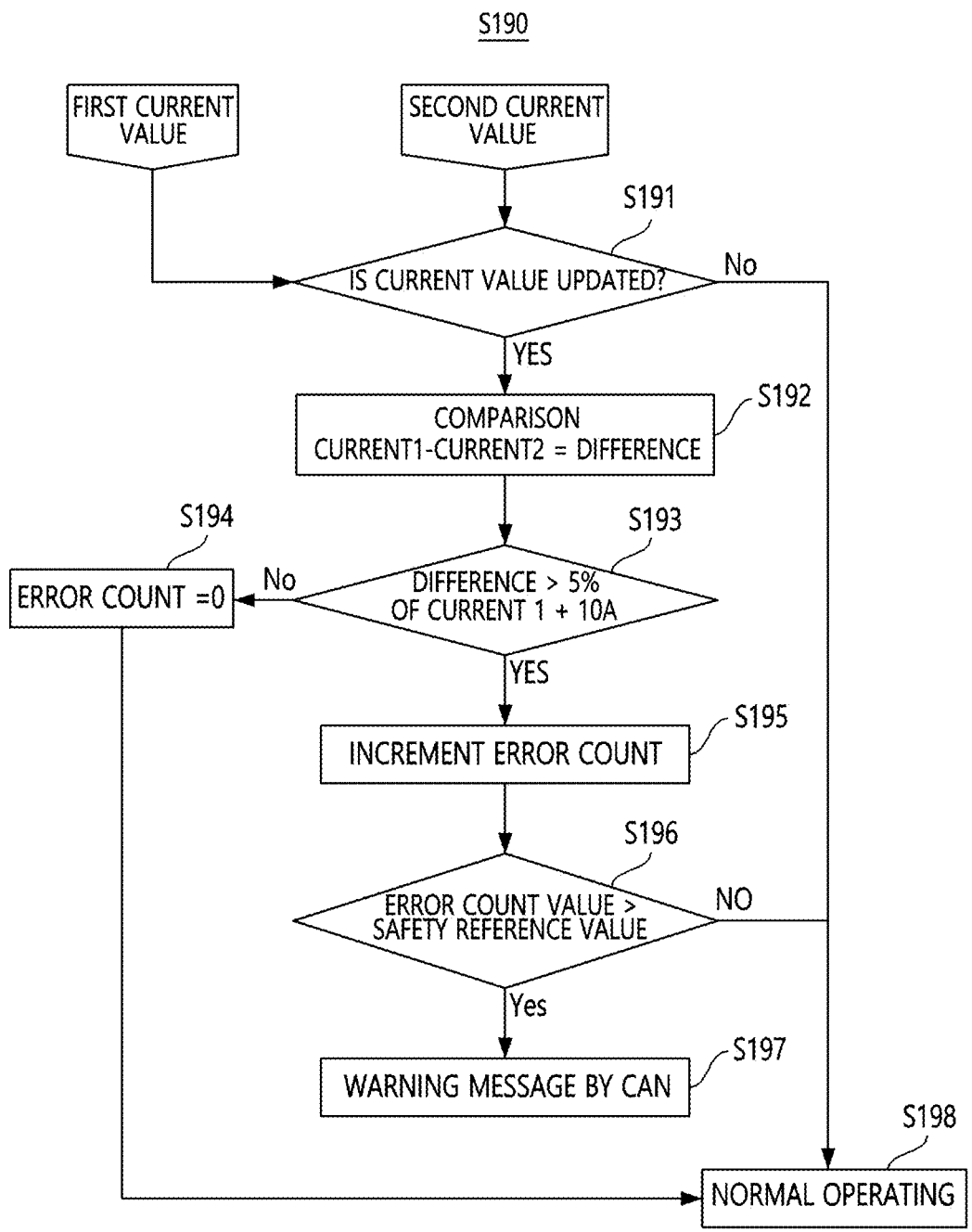
FIG. 15 is a detailed flowchart illustrating operation S190 of the method of FIG. 7.

FIG. 15 is a detailed flowchart illustrating operation S190 of the method of FIG. 7.

Referring to FIG. 15, the current values, derived from real-time measured voltage values, are updated (S191), the difference between the first current value and the second current value is calculated (S192), and the differences in current values are compared (S193). There may be cases where the difference in current values does not exceed the range of the threshold (S194). In cases where the difference in current values exceeds the range of the threshold, a count is incremented (S195). It is determined whether the count of differences in current values exceeding the threshold range falls outside a reference value (S196). If the count exceeds the reference value, a warning message is generated (S197). When the difference in current values does not exceed the threshold, the system is in a normal operating state (S198).

Figure 16:
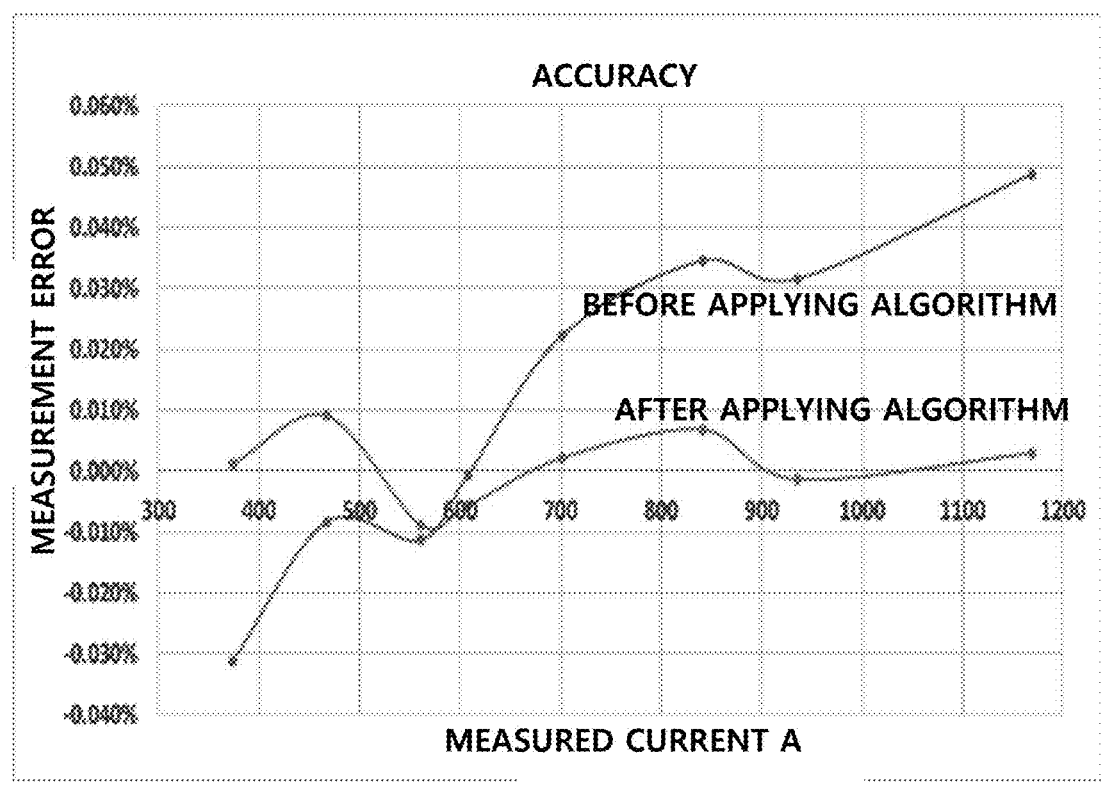
FIG. 16 is a graph showing a comparison of before and after compensation according to an embodiment of the present invention.

FIG. 16 is a graph showing a comparison of before and after compensation according to an embodiment of the present invention.

Referring to FIG. 16, the accuracy of the current value before compensation and the accuracy of the current value after compensation through linearity compensation and temperature compensation are depicted.

FIG. 17 is a table showing an example of the accuracy and linearity resulting from compensation according to an embodiment of the present invention.

Referring to FIG. 17, the error of 0.08% before calibration is reduced to 0.02% through the linearity compensation algorithm. In addition, the current accuracy of the first current value and the second current value before calibration is improved from −0.03 to 0.05% to −0.01 to 0.01%.

According to an embodiment of the present invention, stable and reliable current value measurement is possible through a plurality of shunt resistors based on a redundant design.

Additionally, stable current measurement is achievable based on parallel connection of shunt resistors, as compared to series connection.

Moreover, it is possible to reduce the gaps and increase the robustness of bus bars through parallel connection of bus bars.

Furthermore, measurement errors in current values may be reduced through linearity compensation and temperature compensation.

As described above, although exemplary embodiments of the present invention have been described, various embodiments disclosed in "DETAILED DESCRIPTION OF THE INVENTION" are provided only for the illustrative purpose. Those skilled in the art can understand that various modifications, variations, and equivalents of the present invention are possible based on the above description.

In addition, since the present invention can be realized in various forms, the present invention is not limited to the above embodiments. The disclosed embodiments are provided so that this disclosure will be thorough and complete, and will fully convey the scope of the invention to those skilled in the art. The present invention is only defined within the scope of accompanying claims.

What is claimed is:

1. A bus bar assembly comprising:
   a first conductive plate composed of a first plurality of parts;
   a second conductive plate composed of a second plurality of parts; and
   an insulator formed between the first conductive plate and the second conductive plate, wherein
   a common first terminal hole is formed at one end of the first conductive plate, one end of the second conductive plate, and one end of the insulator,
   a common second terminal hole is formed at respective opposite ends of the first conductive plate, the second conductive plate, and the insulator,
   the first conductive plate comprises at least one first shunt resistor, wherein the first shunt resistor, between the first plurality of parts of the first conductive plate, electrically connects a first part where the first terminal hole is formed and a second part where the second terminal hole is formed,
   the second conductive plate comprises at least one second shunt resistor, wherein the second shunt resistor, between the second plurality of parts of the second conductive plate, electrically connects a third part where the first terminal hole is formed and a fourth part where the second terminal hole is formed, and
   sensing pins necessary for measuring a voltage drop are formed at both ends of the first shunt resistor and the second shunt resistor.

2. The bus bar assembly of claim 1, wherein
   the first conductive plate comprises a single first shunt resistor,
   a second conductive plate comprises a single second shunt resistor, and
   the sensing pin are configured to comprise a first sensing pin and a second sensing pin that are respectively disposed at both ends of the first shunt resistor; and a third sensing pin and a fourth sensing pin that are respectively disposed at both ends of the second shunt resistor.

3. The bus bar assembly of claim 1, wherein the first shunt resistor and the second shunt resistor are configured to have different resistance values.

4. The bus bar assembly of claim 1, wherein at least one of the first terminal hole or the second terminal hole is configured to be electrically connected to a terminal of a battery.

5. The bus bar assembly of claim 4, wherein the first conductive plate and the second conductive plate are configured to be electrically connected in parallel with each other to the terminal of the battery.

6. A current measuring device comprising:
   a bus bar assembly; and
   a current measurement unit connected to the bus bar assembly,
   wherein the bus bar assembly comprises:
   a first conductive plate composed of a first plurality of parts;
   a second conductive plate composed of a second plurality of parts; and
   an insulator formed between the first conductive plate and the second conductive plate,
   wherein
   a common first terminal hole is formed at one end of the first conductive plate, one end of the second conductive plate, and one end of the insulator,
   a common second terminal hole is formed at respective opposite ends of the first conductive plate, the second conductive plate, and the insulator,
   the first conductive plate comprises at least one first shunt resistor, wherein the first shunt resistor, between the first plurality of parts of the first conductive plate, electrically connects a first part where the first terminal hole is formed and a second part where the second terminal hole is formed,
   the second conductive plate comprises at least one second shunt resistor, wherein the second shunt resistor, between the second plurality of parts of the second conductive plate, electrically connects a third part where the first terminal hole is formed and a fourth part where the second terminal hole is formed, and
   sensing pins necessary for measuring a voltage drop are formed at both ends of the first shunt resistor and the second shunt resistor.

7. The current measuring device of claim 6, wherein the measurement unit may be configured to comprise
   a voltage measuring unit connected to the sensing pins to measure a first voltage drop and a second voltage drop;
   a current calculation unit configured to calculate a first current and a second current that flow through the first shunt resistor and the second shunt resistor, respectively;
   a temperature measurement unit configured to measure a temperature change due to the first current and the second current by using a temperature sensor; and
   a control unit configured to determine a state of a battery using a difference between a first current value and a second current value calculated through synchronization and temperature compensation.

8. The current measuring device of claim 7, further comprising a linearity compensation unit configured to compensate for linearity for each current segment based on an inflection point according to an amplification factor of the first current and the second current.

9. The current measuring device of claim 7, further comprising a temperature compensation unit configured to determine a temperature prediction variable according to the magnitudes of the first and second current values and current application time and perform temperature compensation for the first current value and the second current value using a temperature prediction variable value calculated based on the temperature prediction variable.

10. The current measuring device of claim 7, further comprising a battery state determination unit configured to determine an error according to a range of a difference value and diagnose a state of the battery according to the number of occurrences of error.

11. A method of forming a bus bar assembly comprising:
forming an insulator between a first conductive plate having a first plurality of parts and a second conductive plate having a second plurality of parts;
forming a common first terminal hole at one end of the first conductive plate, one end of the second conductive plate, and one end of the insulator; and
forming a common second terminal hole at respective opposite ends of the first conductive plate, the second conductive plate, and the insulator,
wherein the first conductive plate comprises at least one first shunt resistor, wherein the first shunt resistor, between the first plurality of parts of the first conductive plate, electrically connects a first part where the first terminal hole is formed and a second part where the second terminal hole is formed,
wherein the second conductive plate comprises at least one second shunt resistor, wherein the second shunt resistor, between the second plurality of parts of the second conductive plate, electrically connects a third part where the first terminal hole is formed and a fourth part where the second terminal hole is formed.

12. The method of claim 11, wherein
the first conductive plate comprises a single first shunt resistor,
a second conductive plate comprises a single second shunt resistor, and
is the sensing pin are configured to comprise a first sensing pin and a second sensing pin that are respectively disposed at both ends of the first shunt resistor; and a third sensing pin and a fourth sensing pin that are respectively disposed at both ends of the second shunt resistor.

13. The method of claim 11, wherein the first shunt resistor and the second shunt resistor are configured to have different resistance values.

14. The method of claim 11, wherein at least one of the first terminal hole or the second terminal hole is configured to be electrically connected to a terminal of a battery.

15. The method of claim 14, wherein the first conductive plate and the second conductive plate are configured to be electrically connected in parallel with each other to the terminal of the battery.

* * * * *